Sept. 8, 1970  J. P. RYDER ET AL  3,527,928
ELECTRONIC SEED MONITOR
Filed April 7, 1966  2 Sheets-Sheet 1
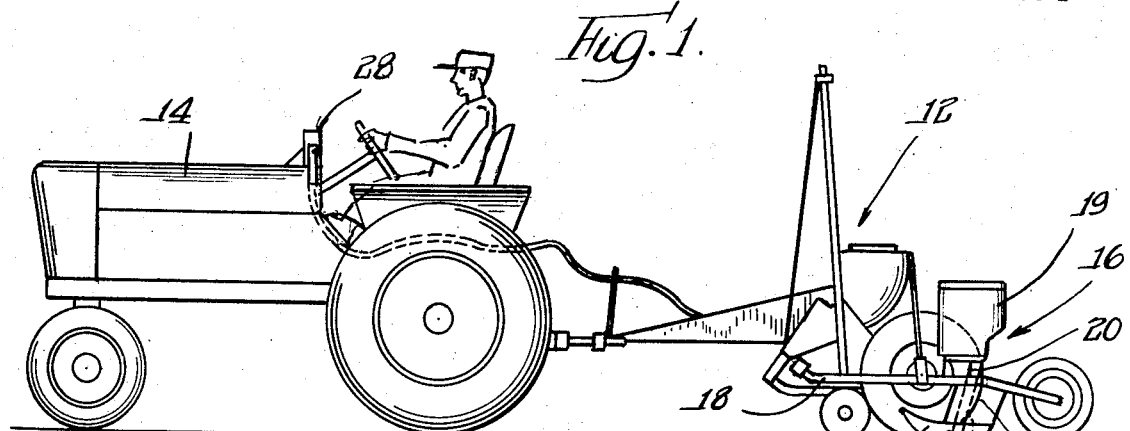
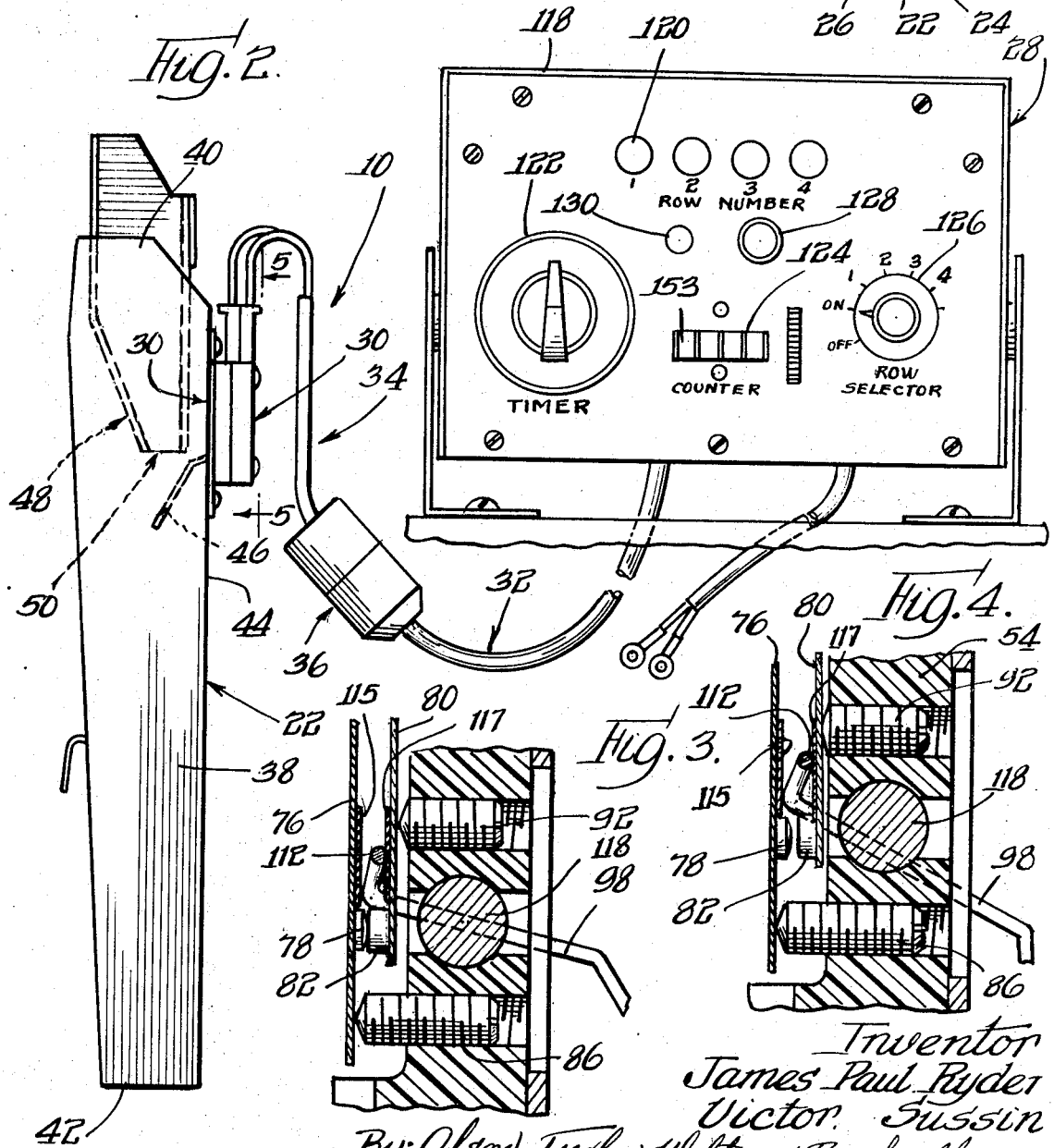
Inventor
James Paul Ryder
Victor Sussin
By: Olson, Trexler, Wolters & Bushnell Attys

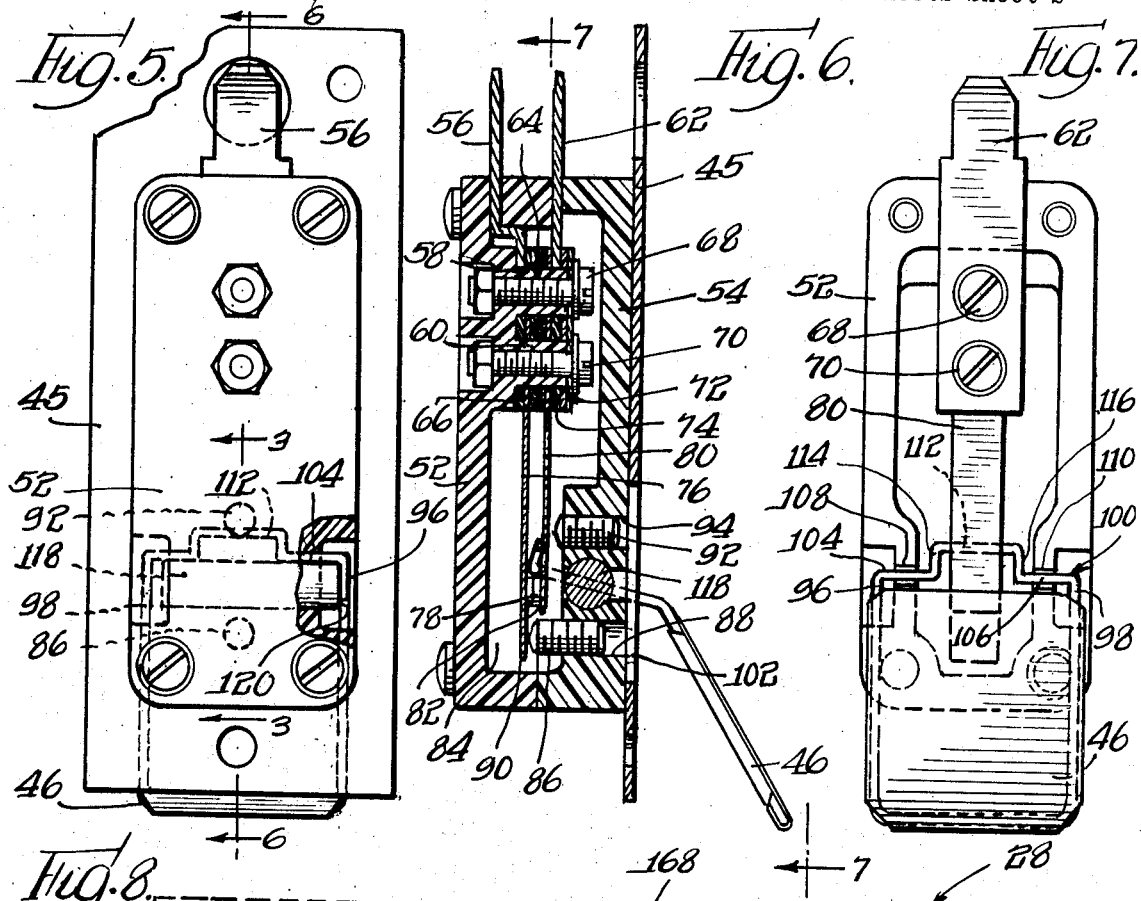
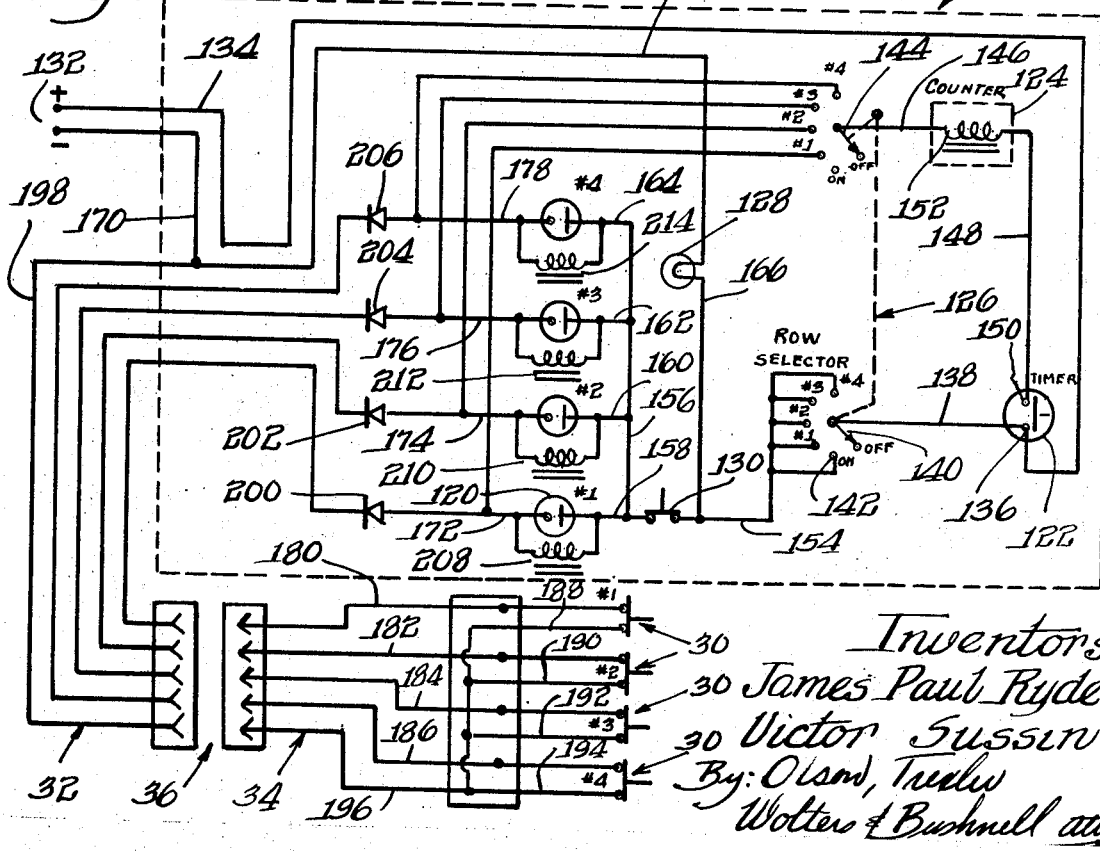

United States Patent Office 3,527,928
Patented Sept. 8, 1970

---

3,527,928
ELECTRONIC SEED MONITOR
James Paul Ryder, Arlington Heights, and Victor Sussin, Elmhurst, Ill., assignors to Dickey-john Corporation, Chatham, Ill., a corporation of Illinois
Filed Apr. 7, 1966, Ser. No. 540,873
Int. Cl. G06m 21/24, 7/04
U.S. Cl. 235—92                                13 Claims

ABSTRACT OF THE DISCLOSURE

A seed monitoring apparatus comrising a switch having a pair of spring blade members supporting first and second contacts biased twoard each other, and a pivotally mounted element engageable by seeds to be monitored and having a portion engaging one of the blade members for opening the switch.

---

The present invention relates to a novel counting or monitoring apparatus, and more specifically to a novel apparatus for counting or monitoring the passage of discreet articles. While certain features of this invention may be adapted for many different uses, the disclosure will be facilitated by directing it particularly to the problem of checking seeds being discharged by a planter.

As is well known, a farmer engaged in mechanized planting of various seeds utilizes a planting machine pulled behind a tractor. Such planting machines usually include a plurality of separate planting devices supplied with seed from separate hoppers so that a plurality of rows of seed may be planted at one time. With planting equipment heretofore in general use, it has usually been difficult if not impossible for a farmer to determine the rate at which seeds are being planted during the actual planting operation and there have been many instances where one or more of the planting units has failed to plant any seed at all due to a breakdown, an empty hopper or the like without the farmer knowing it.

It is an important object of the present invention to provide a novel apparatus whereby the operation of planting equipment may be continuously and accurately monitored for enabling a farmer instantly to determine whether or not the seeds are being planted properly.

A more specific object of the present invention is to provide a novel apparatus substantially responsive to each seed or group of seeds dispensed by a planting unit for enabling an operator to determine the manner in which said unit is functioning.

A further important object of the present invention is to provide a novel seed monitoring apparatus adapted to be installed in association with a planter for enabling an operator to determine the seed population being planted.

A further important object of the present invention is to provide a novel monitoring apparatus capable of acurately and reliably responding to and sensing the passage of discreet articles at relatively high speeds.

A further important object of the present invention is to provide a novel monitoring apparatus of the above-described type which is of simple and rugged construction and may be easily installed in association with a seed planter.

Another specific embodiment of the present invention is to provide a novel switch which is capable of responding quickly and accurately to the application of small pressures and to the passage of discreet articles and which is of simple, long-lasting and easily manufactured construction.

Other objects and advantages of the present invention will become apparent from the following description and the accompanying drawings wherein:

FIG. 1 is a simplified side elevational view showing a a seed planter connected to a tractor;

FIG. 2 is an enlarged view showing a seed monitoring apparatus incorporating features of the present invention;

FIG. 3 is an enlarged fragmentary sectional view of a portion of a switch structure constructed in accordance with features of the present invention and taken generally along line 3—3 in FIG. 5;

FIG. 4 is a sectional view similar to FIG. 3 but showing the manner in which the switch structure functions;

FIG. 5 is an enlarged elevational view of a switch structure incorporating features of the present invention taken generally along line 5—5 in FIG. 2;

FIG. 6 is a sectional view taken along line 6—6 in FIG. 5;

FIG. 7 is a view of a portion of the switch structure taken generally along line 7—7 in FIG. 6; and FIG. 8 is a schematic wiring diagram of a seed monitoring apparatus incorporating features of the present invention.

Referring now more specifically to the drawings wherein like parts are designated by the same numerals throughout the various figures, a seed monitoring apparatus 10 shown in FIG. 2 is adapted to be installed in association with a planter 12 pulled by a tractor 14 as shown in FIG. 1. The planter 12 and tractor 14 may be of various known constructions and need not be described in detail. It suffices to state that the planter includes a plurality of planting units 16 mounted on a frame 18. In the particular embodiment shown for the purpose of illustrating one form of this invention, the seed monitoring apparatus is constructed for association with a planter having four units 16. It is understood however that the monitoring apparatus may be adapted for association with planters having any desired number of planting units.

Each of the planting units 16 may also be of various known constructions and need not be described in detail. In general each planting unit comprises a hopper 19 for containing a supply of seed, a valve or feeding mechanism 20 at the lower end of the hopper for delivering seed into an upper end of a chute 22 forming a part of the monitoring apparatus 10 as will be described more in detail below. The chute 22 is mounted in a depending hollow shank 24 of the planting unit for directing seed into a furrow prepared by a compaction seed runner 26 secured to the lower end of the shank 24.

As shown in FIGS. 1 and 2, the seed monitoring apparatus 10 comprises not only the chute 22 but also a control or indicating panel unit 28 adapted to be mounted at a convenient location on the tractor, a seed sensing switch unit 30 mounted in association with the chute 22, electrical cables 32 and 34 extending from the control unit 28 and switch 30 and a connector device 36 detachably connecting the cables 32 and 34. It is to be understood of course that the apparatus 10 incldes a chute 22 and switch unit 30 for each of the planter units 16 or, in other words, for each row of seed to be planted. In the particular embodiment shown, it is contemplated that the apparatus 10 will include four chutes 22 and four assocated switch units 30 and the electrical cables 32 and 34 are constructed for connecting the four individual switches to the control panel as will be discussed more fully below.

Each chute 22 is adapted by means of flanges, pins, bolts, or the like to be secured within the shank 24 of its associated planter units. It is understood that the shape of the chute and the securing or fastening means therefor may be modified in accordance with the particular planting unit with which the chute is to be associated. In any event, each chute 22 comprises sidewalls defining a passageway 38 for seeds being planted, which passageway has an open mouth or upper end 40 and an open discharge or lower end 42. The switch unit is mounted to one wall 44 of the chute and presents a seed responsive actuating element or blade 46 into the chute as will be described more fully below. A funnel or guide 48 is disposed in the chute adjacent the blade 46 so as to define a narrow throat 50 through which seeds must pass and seeds cannot pass therethrough without striking and depressing the blade element 46.

As shown in FIGS. 2 through 7, each switch unit 30 comprises housing members 52 and 54 secured together and to a mounting plate 45 connected to the wall 44 of the chute. A first electrical prong or strip 56 extends through an end of the housing or body member 52 and is assembled over a pair of apertured posts 58 and 60 formed integrally with the body or housing member 52. A second terminal or conductor strip 62 extends into the housing between the members 52 and 54 and is also assembled over the apertured posts 58 and 60 and is separated from the terminal strip 56 by blocks 64 which are formed of plastic or other suitable electrical insulating material as are the housing or body members 52 and 54. The terminal strips are securely clamped against an abutment surface 66 of the body member 52 by bolt assemblies 68 and 70 extending through the apertured posts 58 and 60 and applying a clamping pressure through a washer 72 and an insulating spacer 74.

A first contact flexure spring member 76 carrying a contact or point element 78 is assembled over the apertured posts 58 and 60 and is clamped in electrical contact with the terminal strip 56 by the insulating spacer member 64. A second contact flexure spring member 80 carrying a point or contact element 82 is also assembled over the apertured posts 58 and 60 and is clamped in electrical contact with the terminal strip 62. Free end portions of the spring members 76 and 80 extend in generally parallel relationship into a chamber 84 defined between the body or housing members 52 and 54 so that the points 78 and 82 are presented for contact with each other.

While the blade member 76 and 80 are shown in generally parallel relationship, it is noted that the blade member 76 is initially curved or deflected so that it tends to extend from its fixed end angularly toward the blade member 80, or in other words, toward the right as viewed in FIG. 6. An adjustable stop element or screw 86 is threadedly mounted in an aperture 88 in a body member 54 for engaging a free end portion 90 of the spring member 76 and providing a positive stop limiting movement of the spring member 76 and thus the point 78 toward the point 82. The blade member 80 may also be initially slightly curved or deflected for biasing the point or contact element 82 toward the point 78. The points 78 and 82 are normally closed, and in order to open the switch, the blade member 80 is moved toward the right as viewed in FIG. 6 in the manner described below. The amount of movement which is required to open the switch may be controlled and changed by adjusting the stop element or screw 86 which in turn adjusts the limit of movement of the blade member 76. A second adjustable stop element or screw 92 is mounted in a threaded aperture 94 in the body member 54 for engaging a blade member 80 and thus limiting the movement of the blade member 80 during opening of the switch so as to prevent excessive movement and promote faster closing of the switch.

As previously mentioned, actuator blade 46 of the switch unit 30 is mounted on and carried by opposite leg sections 96 and 98 of a spring or wire element 100. Lower end portions of the leg sections 96 and 98 extend inwardly and downwardly from the wall 44 of the chute 22 for positioning the paddle 46 at the desired angle and upper portions of the leg sections 96 and 98 extend generally laterally through an opening 102 in the chute wall and mounting plate and merge with axially aligned transverse or pivot sections 104 and 106. The pivot sections 104 and 106 respectively extend through apertures or bearing means 108 and 110 formed integrally in one or both of the housing members 52 and 54. Preferably the aperture or bearing means 108 and 110 are intersected by the dividing line between the body members 52 and 54 for facilitating the assembly of the spring or wire element 100 therebetween.

It is noted that the bearing apertures 108 and 110 are in alignment with the space between the contact springs 76 and 80. Furthermore, the pivot sections 104 and 106 of the wire element 100 merge with an actuating lever section 112 through short lever arms 114 and 116. The actuating section 112 extends between the contact springs 76 and 80 for engagement with the spring 80 as shown in FIGS. 3, 4 and 6.

With the structural arrangement of the actuating blade 46 and wire element 100 described above, it is seen that the wire element is supported for pivotal movement about the common axis of the sections 104 and 106. The weight of the paddle member 46 biases the wire element 100 in a clockwise direction as viewed in FIGS. 3, 4 and 6 so that the actuating or lever section 112 is normally maintained in engagement with the contact spring 80. However, the combined weight of the paddle member 46 and the wire sections 96 and 98 is insufficient to overcome the spring action of the member 80 so that the contact 82 is normally maintained in engagement with the contact or point element 78, as shown best in FIG. 3. When the paddle member 46 is engaged by a seed falling through the throat 50 in the chute 22, the paddle member is depressed so that the lever section 112 of the wire element 100 is pivoted in a clockwise direction for moving the spring element 80 toward the right and opening the switch as shown in FIG. 4. The lever arm provided by the sections 114 and 116 is quite short compared with sections 96 and 98 so that the switch opens easily in response to the engagement of a seed against the paddle member 46. Pads 115 and 117 of electrical insulating material are fixed to the blades 76 and 80 respectively for insulating the wire 100 therefrom.

It will be appreciated that in order to monitor the passage of seeds through the throat 50 reliably and accurately, the paddle member 46 must be capable of operation at high speeds. In order to promote such operation which may, for example, be on the order of 1500 cycles per minute, the switch unit is provided with means for minimizing inertial effects on the paddle member and preventing the paddle from bouncing in a manner which might cause failure to sense the passage of a portion of the seeds. More specifically, the spring blades 76 and 80 are quite stiff so as effectively to dampen any vibrations or oscillations thereof. Furthermore, a permanent magnet 118 is mounted in the switch body member 54 so that one end thereof is positioned adjacent the leg section 96 of the wire element 100 while the opposite end is spaced from the leg 98. The wire element is formed from a magnetic material so that the leg section 96 is magnetically retained against a flat end or friction surface 120 of the magnet. Thus, a magnetic and friction drag is applied to the wire element 100, which drag is sufficient effectively to eliminate undesirable bounces in the operation of the seed sensing paddle member 46. It will be noted that the length of the lever arm provided by the paddle member is quite large as compared with the lever arms 114 and 116 nad may be, for example, about eight to ten times as large for promoting easy operation of the spring blade 80 upon the application of a light force to the paddle.

As previously indicated, the switch units 30 associated with each of the planter devices 16 are connected by cables 32 and 34 with the control or indicating panel unit 28. As shown in FIG. 2 and in the schematic wiring diagram of FIG. 8, the unit 28 comprises a housing 118 in which indicating lights 120 are mounted. In the embodiment shown, the indicating lights 120 are numbered 1 through 4 and correspond to the number of rows of seeds to be planted. It is understood, of course, that the electrical circuit and number of indicating lights can be modified for association with planting apparatus having either a larger or smaller number of planting devices 16. The housing also contains a timer 122, a counter 124 and a gang switch 126 which may all be of known construction and need not be described in detail and which function in a manner described below. A light 128 is provided for indicating when the system is turned on and a test switch 130 is connected as described below for enabling an operator to test the circuit to insure operation of the lights.

Referring particularly to the wiring diagram shown in FIG. 8, the circuit of the apparatus is connected with a suitable source of energy such as a battery 132 of the type usually installed in a tractor. A wire 134 extends from one terminal of the battery to a terminal 136 of the timer 122, which terminal is connected by wire 138 with a blade or movable contact 140 of one side of the selector switch 126. As indicated heretofore, selector switch 126 may be of known construction and the movable contact 140 is mounted on a rotor for movement between an "off" position and a contact 142 at an "on" position. In addition, the blade 140 may be moved to contacts numbered 1 through 4 in FIG. 8 which correspond to the indicator lights 120 which are also numbered 1 through 4. The selector switch 126 has a second movable contact or blade 144 movable in unison with an electrically insulated from the blade 140. The blade 144 is adapted to be moved from an "off" to an "on" position and then for selective engagement with another series of contacts numbered 1 through 4 in FIG. 8. The blade 144 is connected by a wire 146 with the counter 124 which in turn is connected through wire 148 with a second terminal 150 of the timer.

The switch of the timer 122 is normally open so that the coil 152 of the counter 124 is normally deenergized. When the timer is activated, the terminal 150 is connected with the terminal 136 for energizing the coil of the counter and enabling the counter to respond to the passage of seeds as will be described below.

The first of the previously mentioned groups of contacts in the selector switch are connected by wires 154 and 156 to branch wires 158, 160, 162 and 164 which in turn are respectively connected to one side of the indicator lights numbered 1 through 4. The test switch 130 is connected in the wire 154 and the "on" light 128 is connected by wires 166 and 168 between the wire 154 and a wire 170 which in turn is connected with the battery.

The indicator lights number 1 through 4 are respectively connected in series with the switches 30 also numbered 1 through 4 in FIG. 8 and to the wire 170. Thus, wires 172, 174, 176 and 178 extend from the lamps numbered 1 through 4 respectively to the connector 36 for connection to wires 180, 182, 184 and 186 which are respectively connected to one terminal of the switch units 30 numbered 1 through 4. Opposite terminals of the switch units are respectively connected by wires 188, 190, 192 and 194 with a common wire 196 which extends through the connector 36 to a wire 198. The wire 198 is connected with the battery by the wire 170. Rectifiers 200, 202, 204 and 206 are respectively connected in the wires 172 through 178 for enabling all indicator lights to light when the test switch is depressed. The circuitry is such that the indicating lights 120 flash on in response to the passage of seeds past the switch units 30 and thereby provide an operator with a visual indication of the seed flow.

The battery or power source 132 which is now generally conventional in tractors and the like provides 12 volts. The circuits for the lights 120 are normally energized, but it is important to note that the lights 120 are fluorescent gas lights or glow discharge lamps such as small neon lights of a known type for which 12 volts is insufficient to cause lighting. Inductance coils or chokes 208, 210, 212 and 214 are respectively connected in parallel with the lights 120. When an individual light circuit is opened by the opening of its associated switch 30, its inductance coil discharges so as to apply a relatively high voltage to the light which is sufficient to cause the light to flash on. The discharge of the coil is accomplished almost instantly so that the light goes out almost instantly. In other words, the arrangement is such that each time a switch 30 is opened, the inductance coil associated therewith discharges and the light gives off one sharp, short flash.

The heretofore described seed monitoring apparatus is adapted to operate in the following manner. When the selector switch 126 is turned to move the contact 140 from the "off" position to the "on" position, the circuits are completed through the normally closed switch units 30 and the indicator lights so that the light circuits are energized. Then upon operation of the planting devices 16, each individual seed or group of seeds dropping down through the chutes 22 will actuate, or in other words, open the contacts of the associated switch unit 30.

Upon opening of a switch 30, its associated indicating light circuit will be deenergized and the discharge of the coil will energize the light sufficiently to cause it to flash. The combination of the neon light with an inductance coil or choke connected in parallel therewith provides an extremely rapid and sharp response for obtaining a distinct and easily readable flashing of the light in accordance with the flow of the seed. This enables an operator to determine at a glance whether or not seeds are passing down any one or all of the chutes. Furthermore, an operator may determine the approximate rate at which seeds are being discharged by judging the rate at which the indicator light is flashing. In the event an indicator light for any one of the chutes remains steadily out or does not flash, the operator will know instantly that no seed is flowing through the chute.

When an operator wishes to obtain an accurate count of the seed population being planted through any chute, the selector switch 126 is first adjusted so as to move the contacts or blades 140 and 144 to the desired terminal associated with the chute to be checked. For example, the selector switch 126 may be adjusted so that the blades 140 and 144 respectively contact their associated terminals No. 1. Then when the timer 122 is actuated, the counter 124 is energized. As previously indicated, the arrangement is such that when the timer 122 is actuated, the coil of the counter is normally energized. Then when a seed passes through the chute for opening the associated switch unit 30, the circuit is opened so that the associated indicating light circuit is energized and the coil of the counter is deenergized. The inductance coil or choke connected in parallel with the light not only serves to actuate a readily discernible flashing of the light, but the circuit arrangement also promotes a rapid collapse of the magnetic field of the counter coil 152 for increasing the rate of response of the counter. As will be understood, each time the coil of the counter is deenergized and then reenergized in response to the passage of a seed past the associated switch unit 30, the seed is recorded on the counter dials 153.

The counter is of a known commercially available construction having a spring biased shiftable element of magnetic material responsive to the magnetic field created when the coil is energized and adapted to actuate the counter dials 153 through a suitable mechanism. Such counters have heretofore been connected so that their coils are normally deenergized, but it has been found that, in the present apparatus, the counter can be made to function at a relatively higher rate by connecting it so that the coil 152 is normally energized as long as the timer is operating. Normally the counter continues to function for a predetermined time interval set by the timer 122 so that at the end of the interval, the rate at which the seeds are being planted may be determined by dividing the preset time into the total number of seeds recorded by the counter. However, the circuit may be provided with a manually or otherwise operable timer by-pass for enabling the counter to be operated without a time limitation. Such a by-pass may be provided separately by connecting a switch in a line by-passing the timer or it may be included in a timer device of known construction.

While a preferred embodiment of the present invention has been shown and described herein, it is obvious that many structural details may be changed without departing from the spirit and scope of the appended claims.

The invention is claimed as follows:

1. A switch unit quickly and accurately responsive to small pressures and capable of rapid successive operations comprising first and second contacts relatively shiftable between a first closed position and a second open position, yieldably biased support means movably supporting at least one of said contacts for movement between said first and second positions, an actuating element pivotally mounted adjacent said support means and projecting for application of an actuating force thereto, means responsive to movement of said element for shifting said one contact between said positions, said element comprising a portion of magnetic material, and magnetic drag means magnetically coupled with said portion for preventing bouncing of said element durng successive actuations by said articles.

2. A swtch unit quickly and accurately responsive to small pressures and capable of rapid successive operations comprising first and second contacts relatively shiftable between a first closed position and a econd open position, yieldably biased support means movably supporting at least one of said contacts for movement between said first and second positions, an actuating element pivotally mounted adjacent said support means and projecting for application of an actuating force thereto, means responsive to movement of said element for shifting said one contact between said positions, said support means including first and second spring blade members respectively supporting said first and second contacts, said first blade member being yieldably biased in one direction toward said second blade member and said second blade member being yieldably biased in a second opposite direction toward said first blade member, and said means for shifting said one contact being engageable with said second blade member for shifting said second blade member in said one directon.

3. A switch unit, as defined in claim 2, which includes adjustable stop means engaging said first blade member for preventing movement thereof in said one direction.

4. A switch unit, as defined in claim 3, which includes second adjustable stop means normally spaced from said second blade member and disposed for limiting movement of said second blade member in said one direction.

5. A switch unit, as defined in claim 4, wherein said actuating element comprises a relatively long, lightweight member extending for a predetermined length from the pivotal mounting thereof, and said means responsive to said element comprising lever means movable in unison therewith and extending for a relatively short length from said pivotal mounting.

6. Apparatus adapted to be mounted on a seed planting vehicle for monitoring the passage of seeds along a path of travel, said apparatus comprising: a switch unit; an electrical circuit means connectable with said switch unit for indicating operation of said switch unit; said switch unit including, a housing, first and second electrical contacts disposed within said housing in circuit with said electrical circuit means and being relatively movable between a first position and a second position, wherein relative movement produces a detectable signal, first and second spring blade members carried within said housing and supporting said first and second contacts, respectively, a seed operable element having a portion thereof disposed exteriorly of said housing for projecting into said path of travel, said element having an additional portion extending into the interior of said housing and being operably associated with said blade members to produce said relative movement of the contacts upon engagement of said element by one of said seeds, and means for minimizing oscillations of said seed operable element subsequent to an instance of engagement by one or more of said seeds, whereby the detectable signal thus produced indicates an instance of movement of seeds past said switch unit, said monitoring being achieved while isolating said contacts from the environment at the location of the engagement of said element by the seeds.

7. An apparatus, as defined in claim 6, wherein said electrical circuit means comprises means for providing a short light flash as a signal upon operation of said switch unit.

8. An apparatus, as defined in claim 7, wherein said means for providing a short light flash includes a fluorescent gas light and inductance means connected in parallel with said light for flashing the light during discharge of the inductance means.

9. An apparatus, as defined in claim 6, wherein said electric circuit means comprises a counting device responsive to actuation of said switch unit.

10. An apparatus, as defined in claim 9, wherein said electric circuit means includes the timer connected with and controlling operation of said counting device.

11. Apparatus adapted to be mounted on a seed planting vehicle for monitoring the passage of seeds along a path of travel, said apparatus comprising: a switch unit; an electrical circuit means connectable with said switch unit for indicating operation of said switch unit; said switch unit including, first and second electrical contacts in circuit with said electrical circuit means and being relatively movable between a first position and a second position, wherein relative movement produces a detectable signal, first and second spring blade members supporting said first and second contacts, respectively, a seed operable element for projecting into said path of travel and operably associated with said spring blade member, said element being effective to produce said relative movement of the contacts upon engagement by one of said seeds, whereby the detectable signal thus produced indicates an instance of movement of seeds past said switch unit, and means for minimizing oscillations of said seed operable element subsequent to an instance of engagement by one or more of said seeds.

12. An apparatus, as defined in claim 11, wherein said element has a magnetic portion, and said means for minimizing oscillations of said element comprises magnetic means magnetically coupled with said portion.

13. A switch unit useable with apparatus adapted to be mounted on a seed planting vehicle for monitoring the passage of seeds along a path of travel, said apparatus comprising: electrical circuit means connectable with said switch unit for indicating the operation thereof; said switch unit including, a housing, first and second electrical contacts disposed within said housing and adapted for placement in circuit with said electrical circuit means such that relative movement therebetween is adapted to produce a detectable signal, first and second spring blade members carried within said housing and supporting said first and second contacts, respectively, a seed operable element having a portion thereof disposed exteriorly of said housing for projecting into said path of travel, said element having an additional portion extending into the interior of said housing and being operably associated with said blade members to effect relative movement between said contacts upon the engagement of said element by a seed, and means for minimizing oscillations of said seed operable element subsequent to an instance of engagement by one or more of said seeds, whereby the detectable signal so produced indicates an instance of movement of seeds past the switch unit, said monitoring being achieved while isolating said contacts from the environment at the location of the engagement of said element by the seeds.

References Cited

UNITED STATES PATENTS

| | | | |
|---|---|---|---|
| 1,933,976 | 11/1933 | Hanson. | |
| 3,355,102 | 11/1967 | Gregory | 235—98 |
| 2,889,986 | 6/1959 | Magnuson et al. | 235—98 |
| 3,197,620 | 7/1965 | Peltier | 235—92 |
| 2,753,406 | 7/1956 | Pigman | 200—38 |
| 2,912,532 | 11/1959 | Jennings | 200—38 |
| 2,068,713 | 1/1937 | Schellenger | 200—154 |
| 2,548,280 | 4/1951 | Allan | 200—67 |

MAYNARD R. WILBUR, Primary Examiner

R. R. GNUSE, Assistant Examiner

U.S. Cl. X.R.

200—153, 168; 235—98; 340—267